United States Patent [19]
Burkhart

[11] Patent Number: 4,719,899
[45] Date of Patent: Jan. 19, 1988

[54] DEPOT FOR GRANULAR CARBONACEOUS FUEL AND METHOD EMPLOYING THE SAME TO PROVIDE HIGH EFFICIENCY FIRES FOR CHARBROILING AND THE LIKE

[75] Inventor: William H. Burkhart, Los Altos, Calif.

[73] Assignee: Bar-B-Quik Corp., Los Altos, Calif.

[21] Appl. No.: 904,003

[22] Filed: Sep. 3, 1986

[51] Int. Cl.⁴ .................................................. F23H 13/02
[52] U.S. Cl. .............................. 126/163 R; 126/25 R; 126/25 A; 126/152 B; 126/165
[58] Field of Search ................... 44/1 C, 15 R, 16 C; 126/25 R, 25 A, 152 B, 163 R, 165

[56] References Cited

U.S. PATENT DOCUMENTS

| | | | |
|---|---|---|---|
| Re. 6,472 | 6/1875 | Philbrick | 44/14 |
| Re. 18,803 | 4/1933 | Duffy | 126/148 |
| 122,812 | 1/1872 | Chatard | 126/144 |
| 229,596 | 7/1880 | Finck | 44/38 |
| 277,754 | 5/1883 | Lucas | 126/152 R |
| 352,029 | 11/1886 | Bangs | 126/163 A |
| 371,917 | 10/1887 | Bangs | 126/163 A |
| 790,166 | 5/1905 | Wood-Allen | 126/147 |
| 1,312,916 | 8/1919 | Lillie | 110/345 |
| 1,625,556 | 4/1927 | Lomshakoff | 126/163 R X |
| 1,780,205 | 11/1930 | Maurel | 44/14 |
| 1,806,178 | 5/1931 | Rathgeb | 126/163 A |
| 1,926,304 | 9/1933 | Pawlikowski | 44/1 C X |
| 2,946,275 | 7/1960 | Compton | 126/25 A |
| 2,985,165 | 5/1961 | Peterson | 126/165 |
| 3,073,263 | 1/1963 | Wynkoop | 110/1 |
| 3,140,651 | 7/1964 | Barnett | 126/25 R |
| 3,245,398 | 4/1966 | Baker | 126/152 |
| 3,841,849 | 10/1974 | Beckmann | 44/10 H |
| 3,883,317 | 5/1975 | Neme | 44/14 |
| 4,015,977 | 4/1977 | Crawford | 75/3 |
| 4,060,396 | 11/1977 | Burton | 44/14 |
| 4,094,649 | 6/1978 | Osterried | 44/35 |
| 4,243,393 | 1/1981 | Christian | 44/14 |
| 4,244,701 | 1/1981 | Yamashita | 44/1 C |
| 4,302,211 | 11/1981 | Verschuur | 44/24 |
| 4,338,915 | 7/1982 | Martonfi | 126/163 A |
| 4,360,001 | 11/1982 | Thompson | 126/164 |
| 4,502,464 | 3/1985 | Figueroa | 126/163 R |

FOREIGN PATENT DOCUMENTS

| | | |
|---|---|---|
| 620887 | 10/1935 | Fed. Rep. of Germany . |
| 624203 | 1/1936 | Fed. Rep. of Germany . |
| 58-141296 | 2/1982 | Japan . |

OTHER PUBLICATIONS

"Fuel Dusts for Coal Dust Motors", by H. Wahl, Abstracted from *Brennstoff-Chem.*, 16, 6/1/1935 pp. 201–208.

*Primary Examiner*—Samuel Scott
*Assistant Examiner*—Allen J. Flanigan
*Attorney, Agent, or Firm*—Victor R. Beckman

[57] ABSTRACT

A depot for granular carbonaceous fuel is shown including a refractory matrix containing the granular fuel. The refractory matrix includes either one or more baskets of screen material or a refractory binder. Vertical flues are included in the matrix for upward flow of air therethrough during combustion of the granular fuel. A manifold below the matrix supplies air for the vertical flues. Granular fuel and ashes thereof are prevented by the refractory matrix from moving into the flues whereby the flues remain open during combustion of the granular fuel. The fuel may include a relatively large amount of anthracite to provide for a low cost fire. A granular fuel mixture that includes 60 wt % to 80 wt % Buckwheat anthracite and 40 wt % to 20 wt % of charcoal having a size of 35 to 85 mesh Tyler scale is disclosed.

44 Claims, 13 Drawing Figures

FIG-7
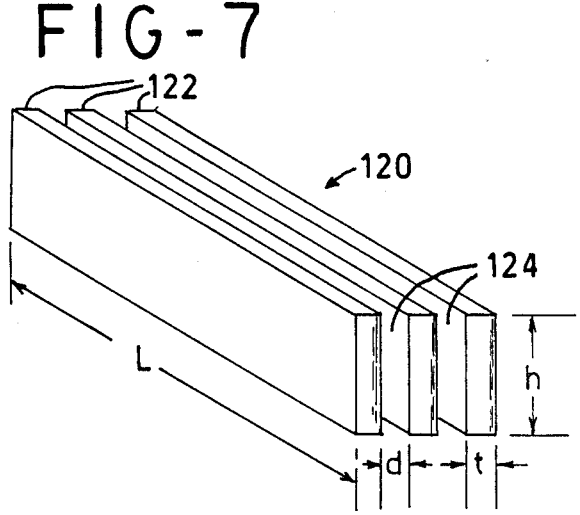
FIG-10
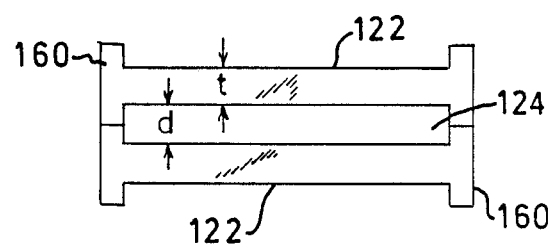
FIG-11
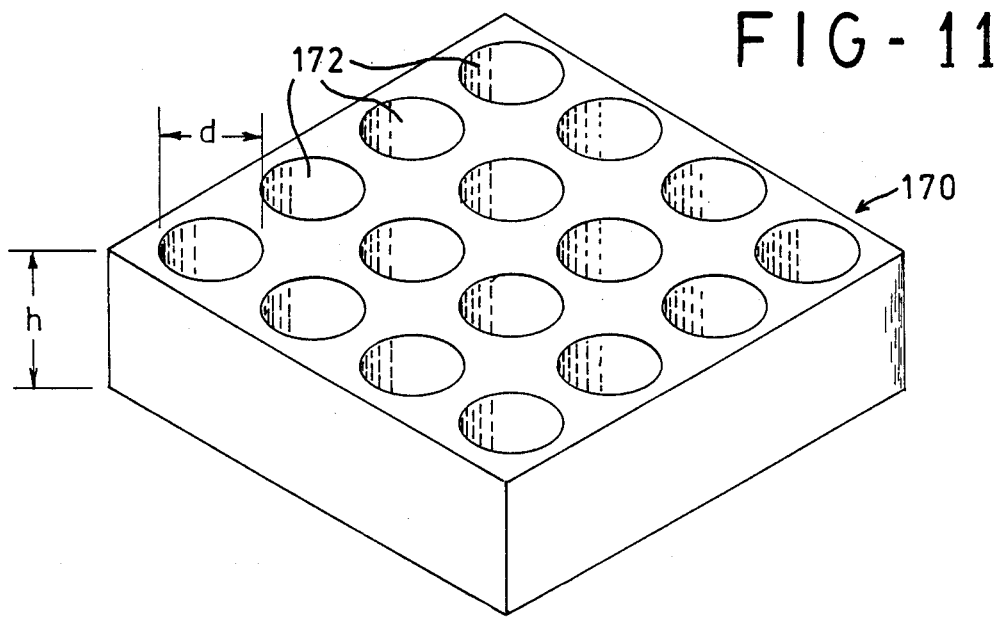
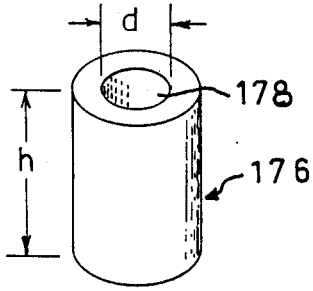
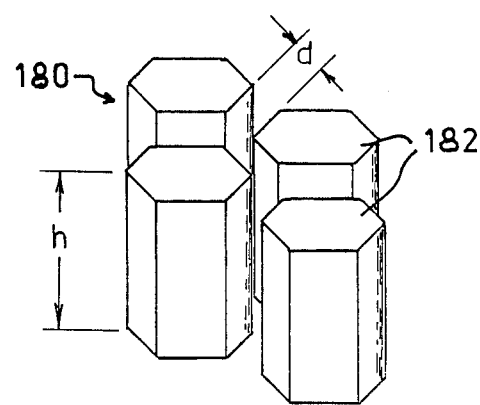
FIG-12
FIG-13

DEPOT FOR GRANULAR CARBONACEOUS FUEL AND METHOD EMPLOYING THE SAME TO PROVIDE HIGH EFFICIENCY FIRES FOR CHARBROILING AND THE LIKE

FIELD OF THE INVENTION

This invention relates generally to the art of charbroiling and the like, and more particularly to a depot for granular carbonaceous fuel which provides for a highly efficient fire for use in charbroiling, and the like.

BACKGROUND OF THE INVENTION

Common charcoal briquettes used for charbroiling are slow to ignite and, once ignited, come to full combustion temperatures very slowly. A one-ounce pillow-shaped charcoal briquette produces only about 25 watts per square inch of grate area covered by the briquette, which is far less than that required to char the surface of a steak if ⅜ to ¾ inch thickness quickly enough to avoid overcooking and dehydrating the interior thereof. In an effort to increase the heat output, it is common practice to mound up the charcoal briquettes. On average, 20 to 30 briquettes may be consumed per fire, which can become quite expensive, particularly when the cost of briquettes is increased by hydrocarbon additives intended to promote ignition. Moreover, charcoal and such additives are subject to inadvertent and spontaneous combustion and produce undesirable fumes.

SUMMARY AND OBJECTS OF THE INVENTION

An object of this invention is the provision of an improved fuel structure and method that overcome or substantially alleviate deficiencies and shortcomings of the prior art.

An object of this invention is the provision of an improved depot for granular carbonaceous fuel and method of burning that provide high efficiency fires for charbroiling and the like.

An object of this invention is the provision of an improved depot of the above-mentioned type that includes vertical flues formed in part by the fuel and which flues remain free for the flow of air therethrough throughout the period of combustion.

An object of this invention is the provision of an improved depot of the above-mentioned type that employs positive feedback of heat of combustion of the fuel throughout the period of combustion whereby even fuel that includes a relatively large proportion of anthracite is rapidly brought from ignition to a high temperature.

An object of this invention is the provision of an improved depot of the above-mentioned type that burns low-cost fuel, is easily ignited, rapidly rises to full heat output, produces approximately 100 watts per square inch of grate, which is about 2 to 4 times the comparable figure for ordinary charcoal briquettes, responds rapidly as a function of airflow to increase or decrease the heat output, burns hot enough to ignite carbon monoxide, produces substantially no toxic, odoriferous or taste-modifying fumes, is safe to store with food, and is safe and easily transportable.

In accordance with the present invention the depot includes a matrix comprising refractory means and containing granular carbonaceous fuel. The matrix includes an array of substantially vertical flues therethrough for upward flow of air during combustion of the granular fuel. A manifold is located beneath the matrix for the supply of air to the matrix and vertical flues. The granular fuel and ashes thereof are prevented by the refractory means from moving into the flues throughout combustion of the granular fuel. By maintaining the flues clear of fuel and ashes, adequate air for complete combustion is made available throughout the combustion process. Positive feedback of the heat of combustion allows for rapid, high-temperature combustion of the fuel when the amount of air supplied to the fuel is in an amount required for full combustion.

BRIEF DESCRIPTION OF THE DRAWINGS

In the drawings, wherein like reference characters refer to the same parts in the several views;

FIG. 7 is a perspective view of a solid fuel structure comprising an array of solid fuel components that can be optimized in accordance with the invention;

FIG. 10 is a plane view illustrating a modification of the embodiment of FIG. 7;

FIG. 11 is a perspective view of a unitary solid fuel structure embodying the present invention;

FIG. 12 is a perspective view of a solid fuel component for use in an array thereof that can be optimized in accordance with the invention; and FIG. 13 is a perspective view of another array of solid fuel components that can be optimized in accordance with the invention.

DESCRIPTION OF PREFERRED EMBODIMENTS

General Considerations

Certain general observations are important to an understanding of the specific embodiments of the invention described hereinbelow and will therefore be considered first.

The cost of charcoal is about 5 times the cost of anthracite coal. Conventional charcoal briquettes may contain up to about 30% anthracite, but the amount of anthracite that has been used in charcoal briquettes has been limited by the difficulties of igniting and burning briquettes containing larger amounts of anthracite. Even without large amounts of anthracite, charcoal briquettes require large amounts of igniting liquid and/or other additives, and the rise to full heat output is quite slow, e.g. 30–40 minutes.

An advantage of charcoal is that once ignited it burns continuously in open air at about 600° F. without an outside source of heat. Under similar circumstances, an anthracite fire is not self-sustaining. Even if a piece of anthracite is heated by a torch to, say, 1800° F., the coal will extinguish itself after removal of the source of heat in a few seconds. The failure of an anthracite fire in open air to be self-sustaining is believed to be due to high radiation losses. In accordance with the Stephan-Boltzman law, radiation is proportional to the fourth power of absolute temperature. In the case of charcoal, the small radiation losses which occur when the charcoal is burning at 600° F. are more than made up by the heat of combustion, so that the fire is self-sustaining in open air. In the case of anthracite, burning at, say, 1800° F., about twenty times as much energy is radiated as from charcoal burning at 600° F., and the radiation losses are so severe that the fire is unable to sustain itself.

However, anthracite fuel will burn rapidly in air when, (1) much of the heat of combustion is fed back to raise the temperature of the fuel and air, and (2) the intake of air is limited to approximately the amount needed for complete combustion. With many prior art arrangements the above-mentioned ideal conditions for burning either are not present initially and/or are not maintained throughout combustion of the fuel. Commercial briquettes consist of granular charcoal and granular anthracite held together with a starch binder. Combustion results in granular ashes which do not adhere to each other with sufficient force to maintain their shape and support the weight of unburned fuel above. Thus, prior art briquettes with combustible binders collapse during burning thereby greatly impeding the flow of air necessary for combustion, or proper combustion. With the present invention, flue depots are provided with flues for air which flues are maintained throughout combustion without blockage by the fuel or its ash.

Loose Granular Fuel Embodiments

Figure 1:
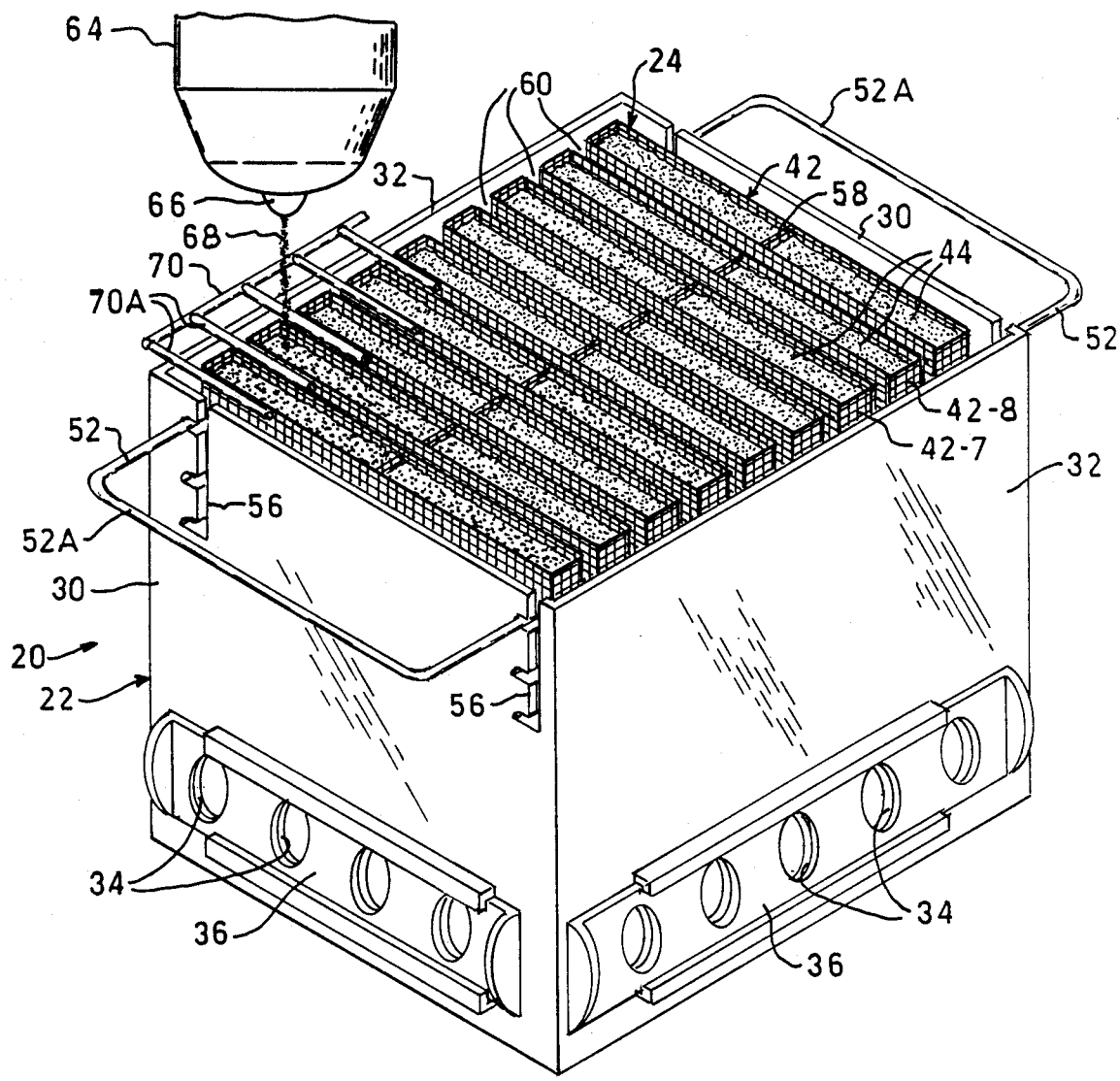
FIG. 1 is a perspective view of a depot for loose granular fuel that embodies the present invention.
Figure 2:
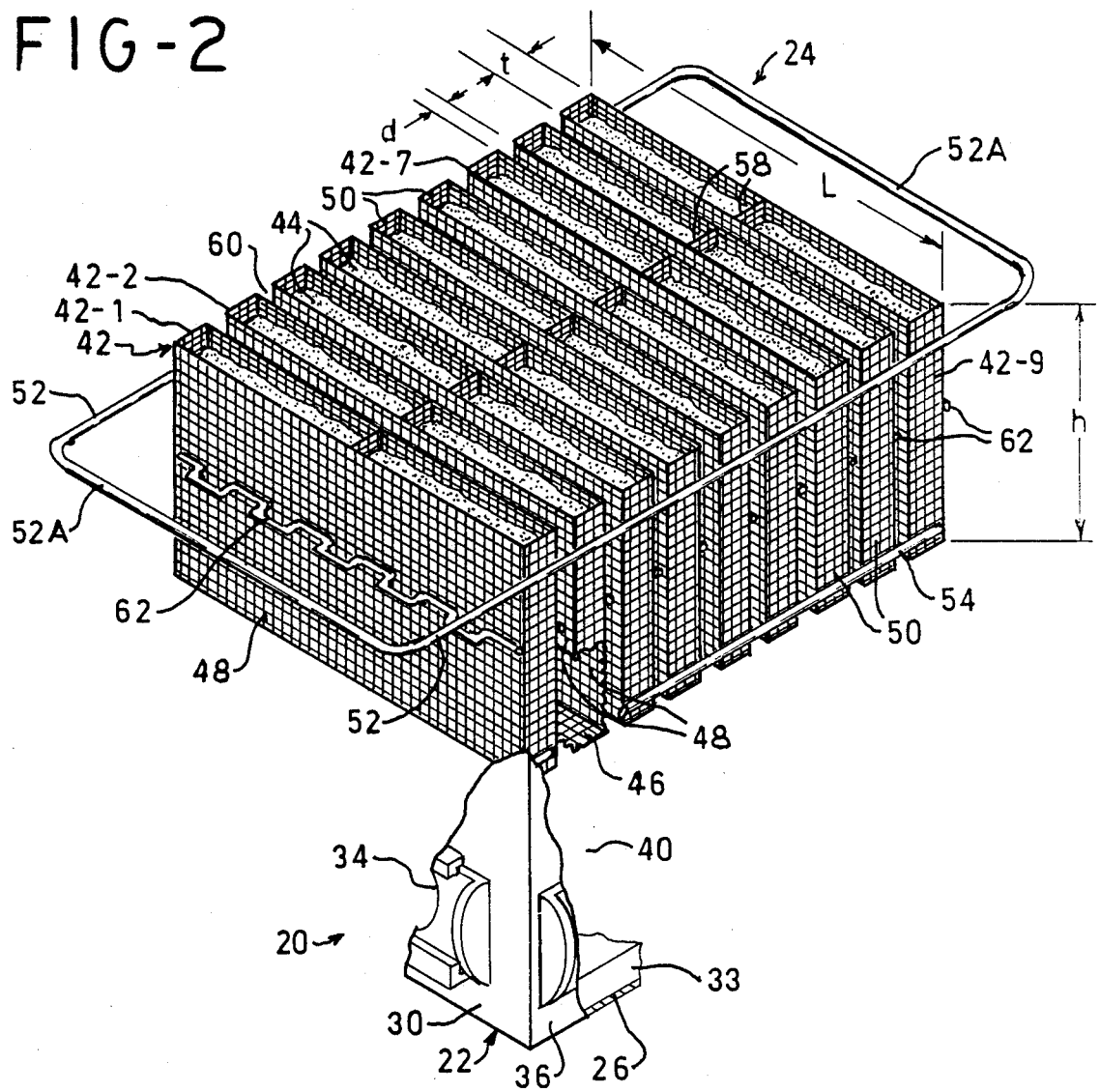
FIG. 2 is a perspective view of the depot shown in FIG. 1 but with the outer refractory housing shown broken away for clarity.

Reference now is made to FIGS. 1 and 2 wherein a broiler 20 is shown comprising a chamber or housing 22 which contains a fuel depot 24. The housing comprises a substantially flat base member 26 substantially vertical end walls 30,30 and side walls 32,32 extending upwardly from the base. A refractory lining 33 of ceramic block, or the like, may be provided at the base 26, and similar refractory lining, not shown, may be provided at the side walls for reflecting heat back onto the fire. Air inlet ports 34 are provided along the bottom of the end and side walls which may be louvered to obstruct wind, and which may be provided with movable cover plates 36 for adjustably opening or shutting vents for control of air flow therethrough. The total vent area is at least large enough to admit the required stoichiometric amount of air, and preferably greater than the stoichiometric requirement. As described below, the cross-sectional flue area for depot 24 is adapted to supply the required stoichiometric amount of air, and the total vent area must at least equal the total cross-sectional flue area to provide the required air volume. A manifold 40 is provided between the ceramic block 33 at the base 26 of housing 22 and the bottom of the depot 24, which manifold is supplied by vents 34 with air for combustion of fuel contained in depot 24.

The loose granular fuel depot 24 shown in FIGS. 1 and 2 comprises a matrix, or linear basket array, 42 which, for purposes of illustration includes nine baskets 42-1 through 42-9 which are adapted to hold granular carbonaceous fuel, and its ash during combustion of the fuel. In FIGS. 1 and 2 the baskets are shown substantially filled with granular fuel 44. Each basket comprises a bottom member 46, opposite parallel side walls 48,48 and opposite end walls 50,50 which are formed of refractory screen, mesh, or similar foraminous material. The baskets are supported in parallel spaced relationship as by means of rigid supporting rods 52 and 54 attached to the baskets at opposite end walls adjacent the upper and lower ends thereof, respectively. The upper rods 52 extend outwardly from the front and rear baskets 42-1 and 42-9, respectively, and are bent inwardly to form handles 52A, 52A to allow for lifting of the depot and positioning thereof within housing 22. As seen in FIG. 1, housing end walls 30,30 are formed with slots 56 which include vertical slot portions that are open at the upper edges of the walls, and spaced transverse slot portions along the vertical slot portion. The handle extensions of supporting rods 52 are insertable in slots 56, and lowered to the desired transverse slot for movement into the selected transverse slot. In FIG. 1, the depot is shown supported in the upper-most position wherein the upper edges of the housing 22 and depot 24 are substantially flush to facilitate loading of the basket array 42 with granular fuel in a manner described below. With the rods 52 fully inserted into transverse slot portions, end walls 50,50 of the baskets are substantially equally spaced from adjacent side walls 32,32 of housing 22.

For added rigidity, the baskets may be provided with center walls 58 extending between opposite side walls 48,48 intermediate opposite end walls 50,50. The center walls may extend continuously from the bottom to the top of the baskets, or they may be segmented, as desired. As noted above, they are intended to add rigidity to the baskets, and help to prevent warping thereof as the baskets are heated during combustion of loose granular fuel 44 contained therein.

The vertical side walls 48 of adjacent baskets are spaced apart to provide for substantially vertically extending flues 60 therebetween. Also, vertically extending flues are formed between the depot 24 and walls 30,30, 32 and 32 of housing 22. Air for combustion is supplied to the vertical flues through ports 34 in housing 22 and manifold 40 below the depot 24. The length L, width t, and height h dimensions of the baskets, together with the spacing d between baskets are indicated in FIG. 2.

Figure 3:
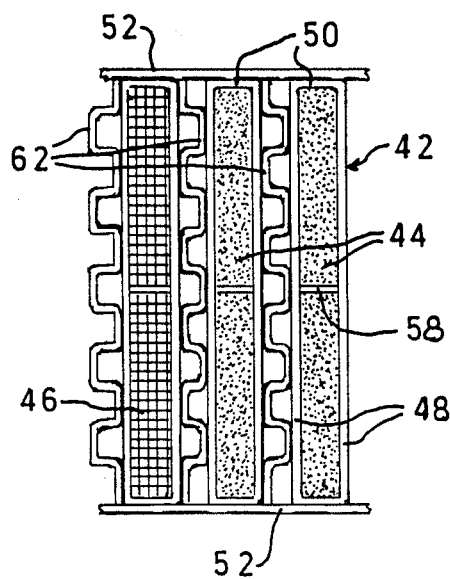
FIG. 3 is a fragmentary top plan view of the depot shown in FIGS. 1 and 2.

Baskets 42-1 through 42-9 expand when heated by the burning fuel contained thereon. If they were to expand outwardly, the vertical flues would be partially blocked thereby decreasing the amount of air available for combustion. To avoid partial blocking of the flues by expansion of the refractory baskets, spacing elements 62 are located between adjacent baskets, and between end baskets 42-1 and 42-9 and the associated end walls 30,30. For purposes of illustration, the spacer elements 62 are shown comprising a ziz-zag wire which may be attached to one basket and which extends across the width d of the flue to engage an adjacent basket, or end wall 30. (See also FIG. 3.) As will become apparent hereinbelow, the granular fuel and its ash are prevented from moving into flues throughout combustion and, since the width d of the flues also is maintained throughout combustion, there is no blockage of the flues by ashes or warpage of the basket whereby air flow may be controlled for combustion at a desired rate, including a rate which provides for maximum heat output.

The refractory baskets of matrix 24 may be loaded with granular fuel as from a dispenser 64 containing the fuel and having a spout 66 from which a stream 68 of fuel is dispensed as shown in FIG. 1. In FIG. 1, a fragmentary portion of a grill 70 is shown, which grill includes parallel spaced elements 70A. The grill is positioned on the housing 22 and is adapted to support food to be broiled and to facilitate directing of the stream 68 of fuel from the dispenser into the baskets. The parallel grill elements 70A are spaced apart the same distance as the flues 60 between baskets and are located directly over the flues when loading the baskets with fuel. Granular fuel directed onto the grill elements is deflected thereby into the baskets. Consequently, the baskets are readily loaded with fuel with a minimum amount of the fuel falling to the bottom of housing 22 through the flues.

The refractory screen, or mesh, of which the baskets are formed have sufficiently small openings to avoid granular fuel, or ash of the fuel, from passing therethrough during combustion. For example, a 50 to 70 mesh screen may be employed in which the screen openings comprise approximately 30 to 40% of the total screen area. The granular fuel may comprise a mixture of charcoal and anthracite comprising, for example, from 30 to 80% anthracite by weight. Preferably, the mixture includes more anthracite than charcoal, for example, 70% by weight of anthracite and 30% by weight of charcoal. Although the BTU value per pound of anthracite is approximately equal to that of charcoal, the density of anthracite is approximately twice that of charcoal. Advantages of using a maximum amount of anthracite in the mixture are that anthracite is substantially less expensive than charcoal, and, being of greater density than charcoal, anthracite takes up less space than charcoal for equal BTU values thereof. However, as the amount of anthracite in the mixture is increased, particularly above 70%, difficulty in igniting the mixture also increases disproportionately.

Also, different maximum size particles of anthracite and charcoal preferably are employed in the fuel mixture to minimize the volume of the resultant mixture. For example, charcoal having a maximum mesh size of 70 to 80 mesh Tyler scale may be combined with Buckwheat #5 anthracite having a maximum size of about 13 mesh Tyler scale. Bridging of the fuel particles, and of the ash thereof, substantially prevents flow of the fuel and its ash through the openings in the mesh baskets. It will be noted that there is no blockage of manifold 40 or vertical flues 60 by either the granular fuel 44 or by the ash thereof since substantially all of the fuel and ash is retained in the baskets without flowing through the basket openings before and throughout the combustion process.

A consideration of basket and flue dimensions for practical embodiments of the invention now will be provided. As noted above, the present invention relies upon positive heat feedback for rapid, high-temperature combustion of the granular fuel. Here, positive feedback of the heat of combustion refers to radiant heat which travels from burning fuel contained in one basket to an adjacent basket to raise the temperature thereof, or to heat reflected or reradiated from the heated housing back onto the fuel. As noted above the base and walls of housing 22 may be provided with a refractory lining of, say, insulating ceramic block, ceramic fabric, or the like for increased reflection or reradiation of heat back onto the burning fuel; only base lining 33 being shown.

Assume that the granular fuel 44 in depot 24 is ignited at the bottom of the baskets as by use of an electrical igniter, or the like. The nature of the resultant fire will depend upon the relative dimensions of the depot. If the flue width, d, is quite small, all of the oxygen in the incoming air will be consumed in burning of fuel adjacent the bottom of the flue and, as a result, there will be no combustion above that level. If the fuel comprises mostly anthracite, the fire may extinguish itself when the source of external heat, i.e. igniter, is removed. Under this condition of limited oxygen, if the fire is not self-extinguishing, a band of orange or yellow fire will be seen where combustion is taking place adjacent the bottom of the flue followed by hot but oxygen-starved upper regions that appear red and finally black. As the fuel burns to ash, the bright fire band gradually rises in the flue, finally reaching the top and leaving a basket of ash.

If the flue width, d, is increased, but the condition of limited oxygen continues, then the band of combustion increases in height. If the flue width, d, is increased to provide stoichiometric oxygen, the fuel burns along the entire duct wall and the rate of combustion is maximized. Any further increase in flue width, d, will result in a loss in energy because heat will be wasted in heating excess air, principally nitrogen. Also, because of the increased flue width, positive radiation feedback to the fuel decreases due to the greater range of angles at which heat may radiate out of the fire from points along the burning surface of the flue. Additionally, there is a decrease in burn area per square inch of grate with increased flue width, d.

From the above, it will be apparent that positive feedback controls the combustion temperature and often determines whether a fire will be self-sustaining. Moreover, positive feedback enhances the response to adjustment of airflow. As described below, fuel depots of this invention may be configured so as to provide sufficient positive feedback of heat to burning surfaces, and to combustion air, to maintain the fuel temperature at a high enough level to ensure rapid combustion and high BTU/minute (watts) output rates. With a fuel mixture that includes 60 to 80% anthracite by weight, temperatures higher than 2000° F. are possible. However, temperatures higher than 2000° F. generally necessitate the use of more costly refractory materials in construction of the broiler.

In the art of fluid mechanics, hydraulic diameter, $D_h$, is employed in the analysis of fluid flow through non-circular ducts. $D_h$ is the diameter of a circular duct in which flow is equivalent to that in the non-circular duct. It is approximately defined as:

$$D_h = \frac{4A}{P} \tag{1}$$

$$= \frac{4(\text{Duct cross-sectional area})}{\text{Wetted Perimeter}}$$

In the case of rectangular flues having a cross section area of Ld, when L is much greater than d, hydraulic diameter is defined as:

$$D_h = \lim_{L \to \infty} \frac{4Ld}{2(L+d)} = 2d \qquad (2)$$

(See *Fundamentals of Fluid Mechanics*, 1985, Philip Gerhart, p. 443.)

Tests with flues where d=3/16 inch is the optimum spacing between flat flue walls and tests of equal length circular flues where the optimum is found to be D=⅜ inch support the use of the above formula, where D=diameter of the circular flue.

It has been found that for any given flue hydraulic diameter, $D_h$, there exists an optimum flue height, h, such that the entire flue height will burn concurrently, and the temperature inside the flue will rise very rapidly and remain high until most of the fuel is burned. The ratio of $D_h$ to h required for substantially stoichiometric burning is dependent upon a number of factors including fuel mixture employed, mesh pore size, and configuration of the matrix.

Using a high percentage of anthracite in the fuel and hydraulic diameters in the range $0.30 < D_h < 0.40$ inch, it has been found that the maximum combustion rate occurs when the flue height is approximately, $$h = 3D_h. \qquad (3)$$

For the FIG. 1 embodiment, a hydraulic diameter in the range of 0.30 to 0.50 inches is provided by use of basket spacings in the range of 0.15 to 0.25 inches using equation (2).

In fluid dynamics, analytical methods for determining turbulent flow require data obtained experimentally. (See *Fundamentals of Fluid Mechanics*, 1985, Philip Gerhart, p. 30.) In the case of burning flue walls the above formulae are approximations that are useful as a starting point in design. Although it is not possible to predict what the optimum flue width is for all possible sizes and embodiments of this invention, I have found that with a minimum of experimentation, the optimum flue size for a given arrangement can be easily determined.

Having determined the optimum values experimentally, it has been found that flue height can be increased considerably to extend the life of the fire. In this case the rate of heat output is reduced but the output is more constant during the period of combustion. An optimum flue height for a given hydraulic diameter may be found empirically with a minimum of experimentation.

Moreover, to achieve a high power output for charbroiling, the total burning flue surface area $A_b$ should be at least 3 times the total grate area, or 3 in² per in² of grate area, where grate area equals the area beneath the fuel depot. Also, a sufficient amount of fuel must be included in the matrix to provide for a fire of sufficient duration for charbroiling. A fuel weight $W_c$ of 0.25 oz/in² of grate comprises a minimum amount of fuel for short burns. From the above, it will be seen that minimum burn area $A_b$ and fuel weight $W_c$ for depots of the present invention are as follows:

$A_b \geq 3$ in²/in² of grate, and $W_c \geq 0.25$ ounches/in² of grate.

It here will be noted that the above values apply to other embodiments of the invention, including the solid fuel structures described hereinbelow.

Figure 4:
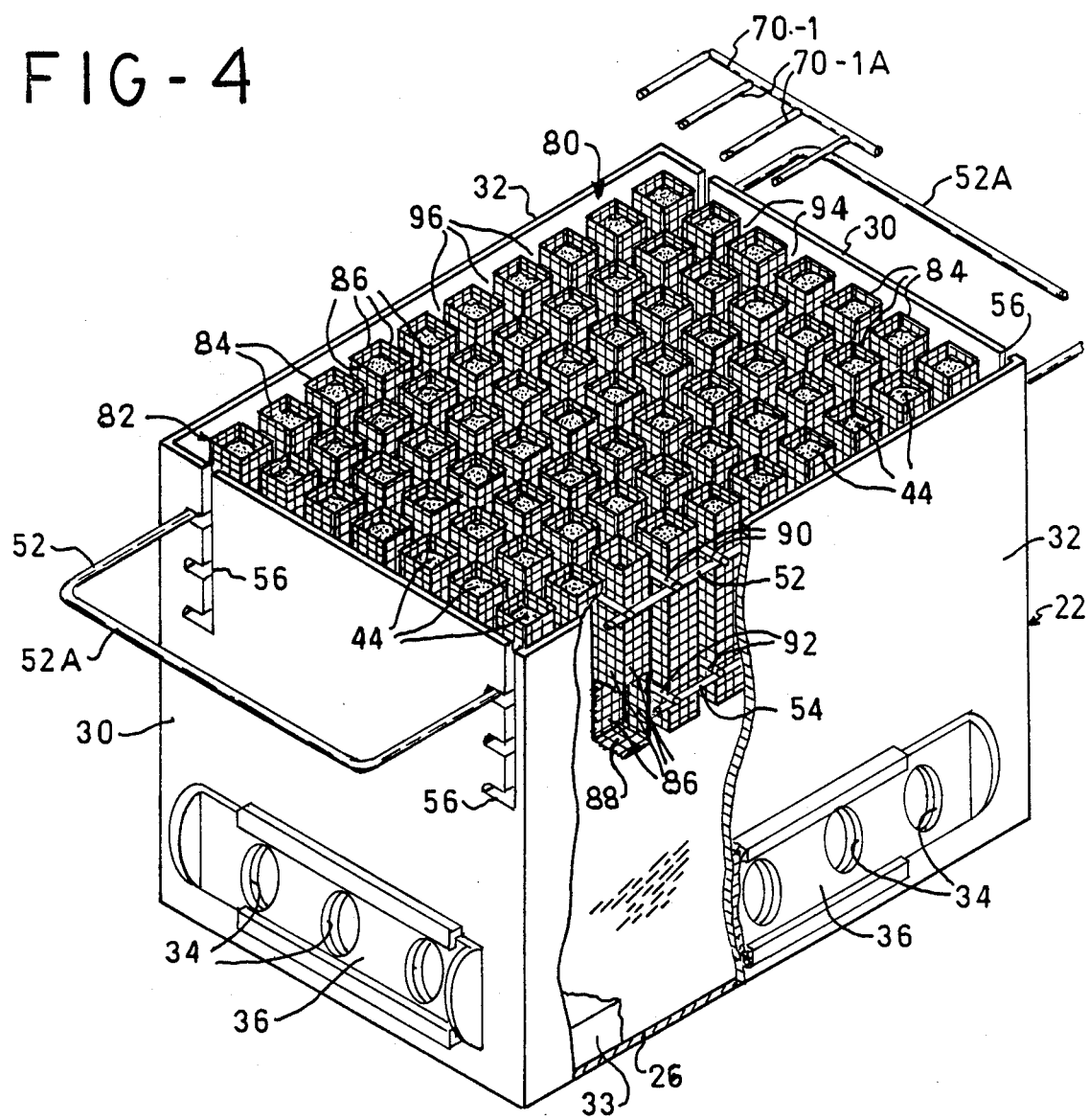
FIG. 4 is a perspective view of a modified form of depot for loose granular fuel embodying the present invention.

Reference now is made to FIG. 4 wherein a modified form of charbroiler embodying the present invention is shown comprising a housing 22 of the same type shown in FIG. 1 together with a modified form of loose granular fuel depot 80. Fuel depot 80 comprises a matrix, or two-dimensional basket array, 82 which, for purposes of illustration includes parallel rows of baskets 84 adapted to hold granular fuel. The baskets include vertical walls 86 and a bottom 88, all of which are formed of refractory screen, or mesh, material.

An upper and lower array of parallel supporting rods 90 and 92 extend between rods 52 and 54, to which the baskets 84 are attached along two adjacent side walls 86 of each basket. Intersecting longitudinal and transverse vertical flues 94 and 96, respectively, are formed between adjacent baskets and between the housing side and end walls and outer-most baskets in the basket array. As with the arrangement shown in FIG. 1, a grill 70-1 with parallel spaced elements 70-1A may be positioned on the housing 22 for support of items to be charbroiled. Spacing of the parallel elements 70-1A coincide with the spacing of the longitudinally extending flues 94 whereby the elements may be located directly over the flues for deflection of granular fuel into the baskets as the baskets are loaded with fuel. Criteria employed in the design of depots of the type shown in FIG. 4, including basket and flue sizes, are substantially the same as described above with respect to the FIG. 1 embodiment. As with the FIG. 1 arrangement, the flues remain unobstructed throughout the period of combustion and the entire flue height burns concurrently at a high temperature as a result of positive heat feedback between burning surfaces.

Figure 5:
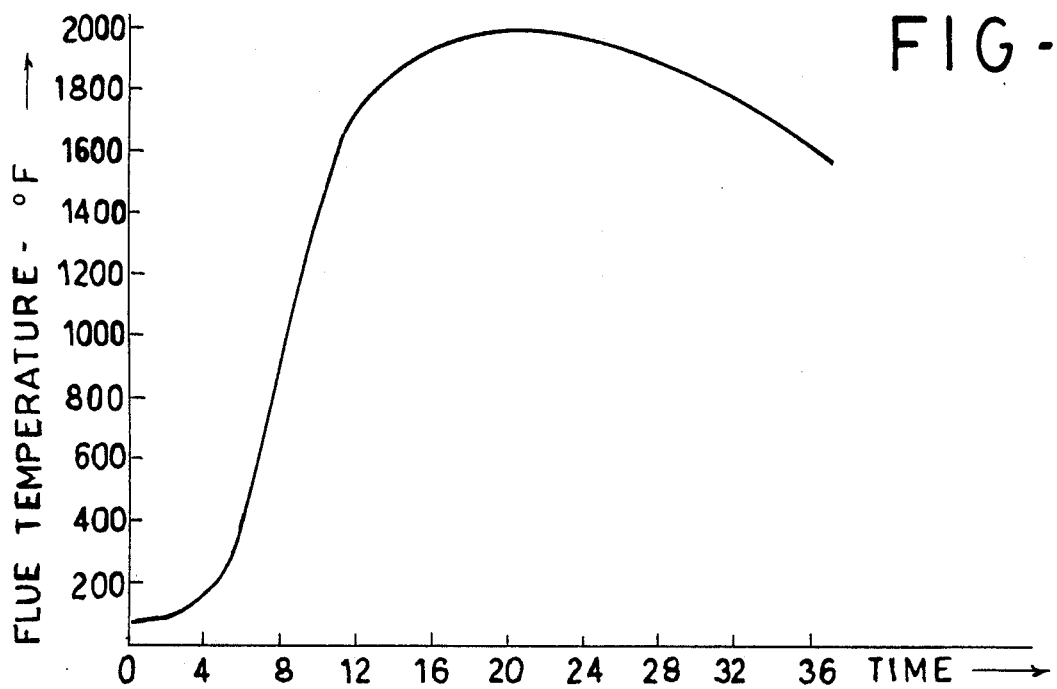
FIG. 5 is a graph of temperature vs time obtained using an arrangement of the type illustrated in FIG. 4.

In FIG. 5, to which reference now is made, a graph of temperature versus time is shown which was obtained from burning only 10.3 ounces of a mixture of anthracite and charcoal comprising 70% anthracite by weight in a matrix of the type shown in FIG. 4. The matrix included a 7×10 array of baskets, which baskets were 0.5 inches square and 1.25 inches high. Centers of the baskets were spaced 0.73 inches apart which provided for flue widths of approximately 0.20 inches and a grate area of 37.3 square inches. Wires 0.050 inches in diameter were used to support the basket array. The fuel was ignited using an electrical heating element. From FIG. 5, it will be seen that high enough temperature for charbroiling, on the order of 1500° F., was reached in approximately 10 minutes time, and that the fire burned at higher temperature for approximately 25 minutes which is ample time for broiling most food items. It will be noted that a temperature of 2000° F. was reached approximately 18 minutes after start of the fire.

Figure 6:
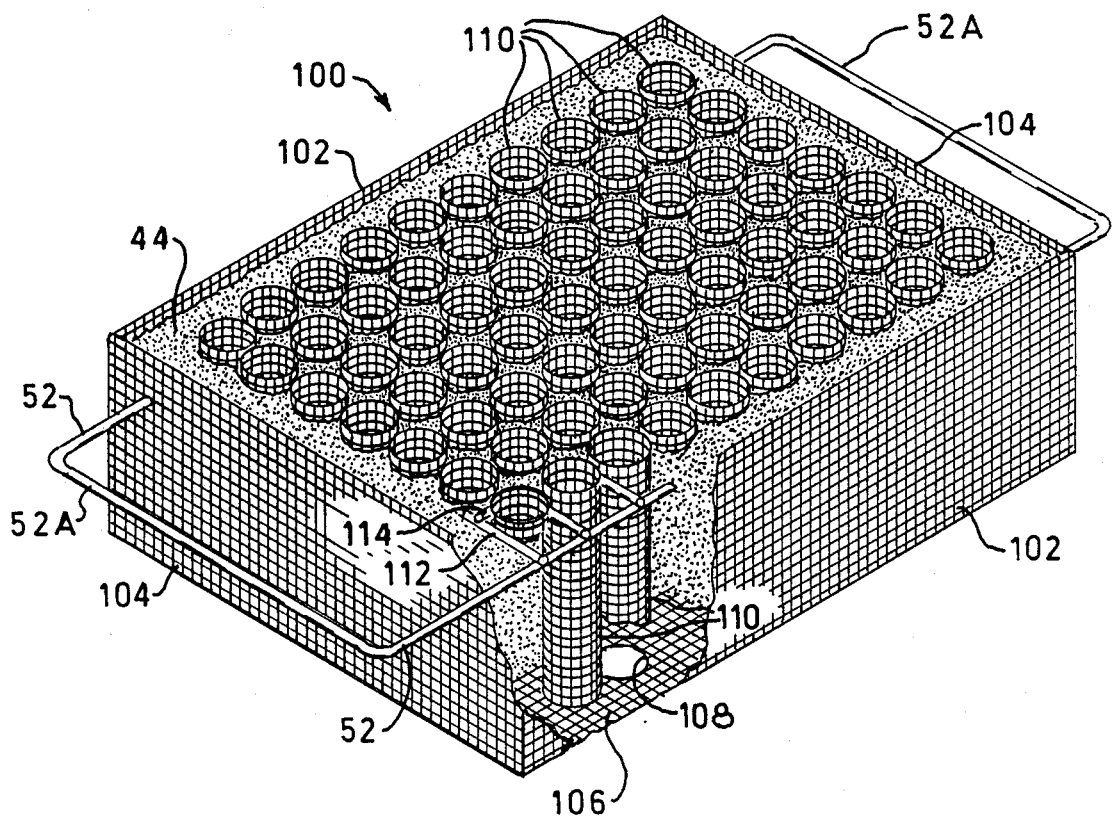
FIG. 6 is a perspective view of another modified form of depot for loose granular fuel embodying the present invention.

Another embodiment of a loose granular fuel depot is shown in FIG. 6, to which figure reference now is made. The fuel depot 100 shown in FIG. 6 is adapted for use with a housing, such as housing 22 shown in FIGS. 1 and 4 and described above. Depot 100 includes a refractory basket comprising side walls 102, 102, end walls 104, 104, and a bottom wall 106. Rigid supporting rods 52 extend for the length of the basket and outwardly from the end walls 104, 104 thereof. As with the other embodiments, handle sections 52A are provided at the outer ends of rods 52.

The bottom 106 of the basket is formed with a two-dimensional array of flue ports 108, one of which is seen in FIG. 6. Flues 110 extend upwardly from ports 108 to the height of the basket walls. In the FIG. 6 arrangement circular ports 108 and cylindrical-shaped flues 110 are shown. Obviously, the flues and ports may be a different cross-section shape, including, e.g. square-shaped.

A grid of longitudinally and transversely extending rods 112 and 114, respectively, provide support for the flues 110 adjacent the upper ends thereof. Flues 110 are attached to the rods 52, 112 and 114, and the ends of transverse rods 112 may be attached to rods 52. The basket and flues are formed of refractory screen material, and the basket is adapted to be loaded with a granular fuel mixture, all of which are of the types described above. As with the above-described embodiments, dimensions of the depot may be selected such that fuel along the entire flue height burns concurrently at a high temperature.

Solid Fuel Structure Embodiments

Fuel depots of this invention which contain granular fuel may comprise solid fuel structures such as shown in FIGS. 7 through 13. In FIG. 7 a solid fuel structure 120 is shown comprising an array of solid fuel components 122. Each solid fuel component is in the form of a slat having a rectangular cross-section. The height h, thickness t, and length L dimensions of the slats, as well as the spacing d between slats is indicated in FIG. 7. With solid fuel structure depots, the granular fuel is included in the structure, and no refractory baskets are required to contain the fuel. The fuel is contained in a refractory matrix of a type which retains its shape and rigidity throughout the burning of the fuel. Consequently, as with the loose granular fuel depots described above, flues remain open throughout the combustion process to allow for optimum burning of the fuel. It will be apparent, then, that the slat-type solid fuel structure 120 of FIG. 7 comprises the analog of the loose granular fuel depot of FIGS. 1-3.

The refractory matrix for solid fuel structures comprises a non-combustible binder. For example, an alkali silicate, such as sodium silicate (Type N) may be employed as the binder in an amount by weight that is about 10% of the weight of the granular carbonaceous fuel. As is well known, sodium silicate can be "set" with a magnesium oxide and high temperature. The magnesium oxide, in amount of approximately 10% by weight of the sodium silicate, makes the sodium silicate waterproof. It here will be noted that anthracite itself is waterproof. Although the solid fuel components may absorb water, like a sponge, they do not fall apart when wet.

A typical solid fuel component in accordance with the invention may be prepared as follows:

Mix 0.6W ground anthracite (No. 5 Buckwheat) with 0.4W ground charcoal (80 mesh) where W is the weight of 100% of the "carbon" in the fuel. To this add 0.025W magnesium oxide and mix well with the ground anthracite and charcoal. Then add 0.25W Type N sodium silicate solution and about 0.06W water. The liquid is added to the dry components and mixed thoroughly to get a "mud" that is rather dry. The resultant mixture is pressed to the desired shape, dried and then cured at about 400° F. Also, if desired, the solid fuel components may be formed by extrusion.

Because of its relatively low cost, the combustible carbon in the solid fuel components of the invention is preferably at least 50% anthracite by weight, although most of the advantages of the invention can be achieved with fuels that are from 100% charcoal to 100% anthracite. As noted above with regard to the loose fuel depots, substantially more heat is required for ignition when over 80% anthracite is used.

The solid fuel mixture should preferably contain a minimum of sulfur and heavy volatile hydrocarbons. Heavy hydrocarbons, when heated, boil, and the vapors self-ignite at about 1200° F. However, if the vapors are not burned, they may condense on cooler food or other surfaces. Moreover, the vapors produce undesirable odors and flavors, and some are believed to be toxic. Other volatile gases, such as methane, are permissible.

Figure 8:
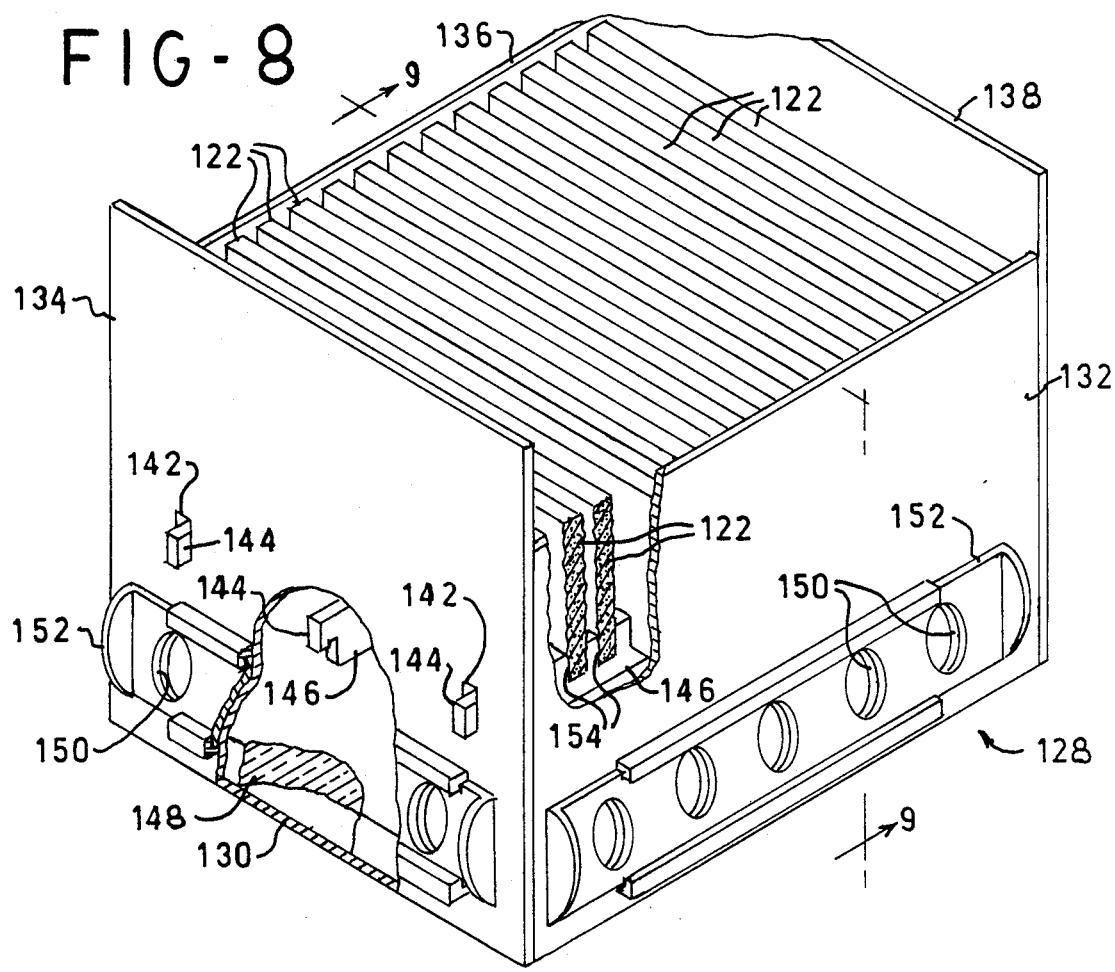
FIG. 8 is a perspective view of a small camp stove (grill) for use with solid fuel components of the type shown in FIG. 7, for example.
Figure 9:
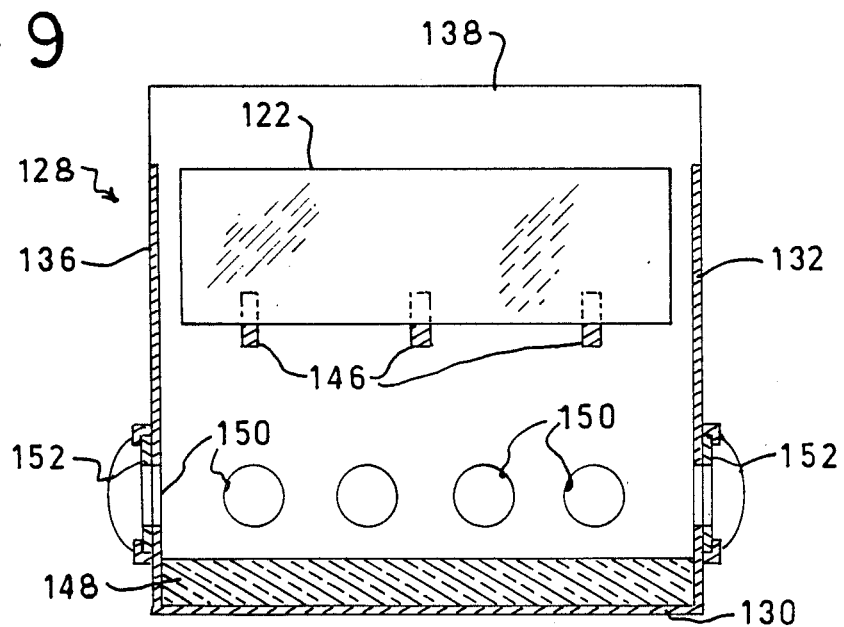
FIG. 9 is a sectional view taken along line 9—9 in FIG. 8.

An arrangement for spacing the slats 122 and for providing a practical appliance to utilize the slats is shown in FIGS. 8 and 9, to which figures reference now is made. There, a grill 128 is shown comprising a base 130 and four side walls 132, 134, 136, and 138 connected to the base. The side walls 134 and 138 each have a row of holes 142 to receive the hooked ends 144 of grate members 146. The upper extremities of side walls 134 and 138 can support a cooking vessel or a grill for food, and the height of side walls 134 and 138 may be greater than that of side walls 132 and 136 to provide exhaust openings above the tops of side walls 132 and 136. Also, extension of the side walls above the grate members 146 can provide a chimney.

Preferably, an insulating ceramic block 148 is located at the base 30, and may substitute for the base. Similar insulating ceramic blocks or ceramic fabric, not shown may be provided on the side walls to reflect and/or reradiate heat back onto the fire. Other refractory material, such as alumina-silicate refractory insulating board may be employed. For maximum positive feedback of heat any surface of a fuel component that is not facing another such surface should face a reradiating surface which will reflect and/or re-radiate a substantial amount of the radiated heat back onto the burning fuel. For present purposes, a reradiating surface comprises either an actual reflector, such as a mirror, or an insulating member whose surface nearest the fire rises to almost the same temperature as the fire.

Air inlet ports 150 are provided in the walls and may be adjustably opened or shut by sliding cover plates 152. The combustion air is preheated by passage over the radiation-heated ceramic block 148. Each grate member 146 has a series of slots 154 for receiving fuel elements 122. The spacing between the fuel elements, and hence the width of the flues, is determined by the spacing of the slots 154.

By experiment, a carbon weight $W_c$ per in² grate of approximately 0.25 oz provides a burn time of approximately 12 minutes. Also, experimentation has shown that when $A_b$ is a minimum of about 3 in²/in² of grate the fire produces the intense heat needed for fast charring. As expected, as $A_b$ is increased, the fire burns hotter, and as $W_c$ is increased the fire burns longer. In a specific embodiment of the invention illustrated in FIGS. 7-9, fuel structure dimensions of h=1 in, L=2 in, t=0.21 in and d=0.25 in may be employed, together with a fuel mixture of 70% anthracite and 30% charcoal by weight.

Reference now is made to FIG. 10 wherein a modified form of solid fuel structure is shown. As noted above, the spacing d between slats, i.e. the width of the flues, is important to ensure adequate heat feedback and sufficient air flow between opposed burning surfaces. Proper spacing may be provided by flanges 160 on the slats as shown in FIG. 10. An array of slats may be provided ab initio by cementing flanges of adjacent slats together. If desired, additional spacing lugs may be provided between the flanges, or in lieu of the flanges. Obviously, other means for proper spacing may be provided. For example, end faces of the slats may be cemented to a retainer sheet or another slat, or porous fillers, such as ceramic fibers, may be inserted between slats.

Reference now is made to FIG. 11 wherein there is shown a fuel depot 170 of the solid structure type which is an analog of the loose granular fuel depot 100 shown in FIG. 6. Fuel depot 170 comprises a unitary rectangular solid fuel structure formed with an array of vertical flues 172 therethrough. The composition of the structure, the height of the block, and diameter of the flues are determined by the same considerations that govern the parameters considered in connection with FIG. 7. In the FIG. 11 arrangement, the hydraulic diameter $D_h$ equals the flue diameter d.

In FIG. 12, to which reference now is made, a solid fuel element 176 is shown, which element may be included in a planar array of such elements. Fuel element 176 is tubular shaped and includes a cylindrical flue 178. An array of such elements would be supported on a grate, not shown. Spacing between elements is selected to provide for the desired burning characteristics for charbroiling.

In the arrangement of FIG. 13, an array 180 of elongated rods or bars 182 of hexagonal cross-section is shown Obviously, other cross-sectional shapes including square-shaped elements, may be used. The bars are arranged vertically and are spaced from one another by a distance d so as to define a flue between each pair of opposed bar surfaces. The number of bars is selected to cover the desired grate area, which may be the same as for the block 170 of FIG. 11. Dimensions including height h and hydraulic diameter $D_h$ are selected for burning at a high temperature for a sufficient period of time for broiling, or other purpose which may be made of the heat. As described above, for high power output the total flue surface area $A_b$ preferably is at least three times the underlying grate area. That is, the vertical burning area $A_b$ should be at least 3 square inches per square inch of grate.

As noted above all of the solid fuel structures include refractory means for support of the granular carbonaceous fuel contained in the structure which enables the fuel structures to substantially maintain their shape throughout the combustion process. As a result, flow of air through the flues is unrestricted during combustion whereby adequate air for complete combustion is made available throughout the combustion process. In the loose granular fuel embodiments, the baskets of refractory screen material serve to hold the fuel and its ash thereby providing for unrestricted diffusion of air and exhaust gas through the flues throughout the combustion process.

The invention having been described in detail in accordance with requirements of the Patent Statutes, other changes and modifications will suggest themselves to those skilled in this art. For example, a chimney and/or blower may be used to force air through the flues, in which case the optimum hydraulic diameter is reduced. Also, stacks of fuel depots may be employed, if desired. It is intended that such changes and modifications shall fall within the spirit and scope of the invention defined in the appended claims.

I claim:

1. A depot for granular carbonaceous fuel comprising, basket means of refractory material for supporting said granular fuel and ashes thereof during combustion of the fuel, said basket means including an array of substantially vertical porous flues therethrough for upward flow of air through the flues during combustion of the granular fuel contained in the basket means, which air flow provides oxygen for combustion of granular fuel contained in the basket means, said flues having predetermined dimensions such that feedback of heat across flues between opposing flue surfaces provides for rapid high-temperature combustion of said granular fuel, said basket means preventing movement of said granular material and ashes into the flues and resultant restriction of air flow through the flues during combustion of the granular fuel.

2. A depot as defined in claim 1 wherein the granular fuel is in a loose form, and said basket means comprise an array of baskets of refractory screen material spaced apart between substantially 0.15 and 0.25 inches.

3. A depot as defined in claim 1 wherein the smallest granular fuel particles are of a size substantially equal to the size of pores in the flues.

4. A depot as defined in claim 1 wherein said basket means comprises an array of spaced-apart baskets of screen material between which baskets vertical flues are formed.

5. A depot as defined in claim 4 including spacing means in vertical flues between adjacent baskets to prevent closure of flues by expansion of basket walls into vertical flues.

6. A depot as defined in claim 4 wherein said array of baskets comprises a linear array.

7. A depot as defined in claim 4 wherein said array of baskets comprises a two-dimensional array.

8. A depot as defined in claim 7 wherein the baskets are of a substantially square cross-sectional shape.

9. A depot as defined in claim 1 wherein said basket means comprises a unitary basket having a bottom member formed with an array of apertures, and tubes extending upwardly from the bottom member at the apertures to provide for said array of substantially vertical flues.

10. A depot as defined in claim 1 wherein said fuel comprises at least 50% by weight anthracite, the remainder comprising charcoal granules of larger size than 100 mesh Tyler scale.

11. A depot as defined in claim 10 wherein pores in the flues are substantially equal in size to the smallest granular fuel particles.

12. A depot as defined in claim 10 wherein said anthracite comprises Buckwheat #5 anthracite.

13. A depot as defined in claim 1 wherein said granular fuel comprises a mixture of anthracite and charcoal.

14. A depot as defined in claim 13 wherein said granular fuel mixture comprises at least 50% by weight of anthracite.

15. A depot as defined in claim 13 wherein said anthracite of the fuel mixture comprises Buckwheat #5, and the charcoal granules are of greater size than 100 mesh Tyler scale.

16. A depot as defined in claim 13 wherein components of the fuel mixture are of different size whereby the smaller-size components fit interstitially with the larger-size components.

17. A depot as defined in claim 13 wherein the weight of granular fuel within the matrix is equal to or greater than ¼ ounces per in² of area underlying the depot.

18. A depot as defined in claim 17 wherein the total burn area of the flues is equal to or greater than 3 in² per in² of area underlying the depot.

19. A depot as defined in claim 1 wherein flue gas temperature in said vertical flues exceeds 1500° F. during combustion of said granular material.

20. A depot as defined in claim 1 including, means forming a manifold beneath said basket means for flow of air to said vertical flues.

21. A method of providing a fire for charbroiling or the like comprising,
providing an array of baskets of refractory screen which baskets are spaced from each other to define a plurality of flues therebetween,
loading said baskets with granular fuel in preparation for burning,
burning the granular fuel contained in the baskets, the spacing between adjacent baskets being such that feedback of heat across the flues between opposing basket surfaces provides for rapid high-temperature combustion of granular fuel contained in the baskets,
substantially maintaining the flue dimensions while burning the granular fuel to maintain the rapid high-temperature combustion during burning.

22. A fuel depot comprising carbonaceous granular material that is at least 50% anthracite, by weight,
basket means of porous refractory material for holding the granular material and its ash,
said depot defining an array of substantially vertical porous flues having a hydraulic diameter of between substantially 0.3 and 0.5 inches and having a height of at least two times said hydraulic diameter to provide feedback of heat radiating from burning portions of the flues to other burning portions thereof, and
means for substantially maintaining the shape of the depot throughout burning of the carbonaceous granular material to avoid restricting passage of air through the flues by the granular fuel or its ash throughout said burning.

23. A fuel depot as defined in claim 22 wherein the smallest granular fuel particles are of a size substantially equal to the size of pores in said porous refractory material.

24. A fuel depot as defined in claim 22 wherein
$A_b \geq 3$ in²/in² area underlying the depot, and
$W_c \geq 0.25$ oz/in² area underlying the depot,
where:
$A_b$ = burn area of the vertical flues, and
$W_c$ = weight of carbonaceous granular material.

25. A depot as defined in claim 1 wherein said flues have a hydraulic diameter of between substantially 0.3 to 0.5 inches and a height of at least 2 times said hydraulic diameter.

26. A depot for granular carbonaceous fuel comprising,
an array of baskets of refractory screen material for containing granular carbonaceous material, said screen material having pores of a sufficiently small size to support both said granular fuel and the ash thereof whereby substantially all of the fuel and its ash is contained in said baskets throughout combustion of the granular fuel,
means for holding said baskets in spaced apart positions to form an array of flues therebetween for flow of air during combustion of the granular fuel, which air flow provides for combustion of granular fuel in the baskets,
wherein said baskets are sufficiently spaced to provide feedback of heat across the flues between opposing basket surfaces for rapid high-temperature combustion of granular fuel contained in the baskets.

27. A depot as defined in claim 26 wherein said flues have a hydraulic diameter of between substantially 0.3 and 0.5 inches and a height of at least 2 times said hydraulic diameter.

28. A depot as defined in claim 27 wherein granular fuel adapted to be contained in said baskets comprises at least 50% by weight granular anthracite, the remainder comprising lower temperature burning granular carbonaceous material.

29. A depot as defined in claim 28 wherein granular fuel in said baskets burns at a temperature exceeding 1500° F. with unforced air flow through said flues.

30. A depot as defined in claim 28 wherein the lower temperature burning granular carbonaceous material comprises charcoal.

31. A depot as defined in claim 27 including a grill for receiving food to be charbroiled in spaced relationship over the depot.

32. A depot as defined in claim 26 wherein the total horizontal cross-sectional area of said flues and the total horizontal cross-sectional area of said baskets are substantially equal.

33. A method of providing a high temperature fire of loose granular carbonaceous fuel comprising,
providing refractory basket means for holding the granular carbonaceous fuel to be burned,
providing a plurality of open-ended porous refractory flues through said basket means, which flues have pores small enough to prevent the granular fuel and ashes thereof from entering the flues yet allow diffusion of air from the flue to the fuel and allow exit of the gaseous products of combustion into said flues,
providing said flues with a hydraulic diameter that is no larger than necessary to supply the amount of air needed for rapid, high-temperature combustion of the fuel and with a flue surface area that is substantially greater than the flue cross sectional area.

34. In a method as defined in claim 33 wherein said flues are provided with a hydraulic diameter of between 0.3 and 0.5 inches.

35. In a method as defined in claim 34 wherein substantially vertically extending flues are provided which have a surface area that is at least six times the flue cross-sectional area.

36. A depot for granular carbonaceous fuel comprising,
refractory basket means for holding loose granular carbonaceous fuel,
an array of open ended flues extending through said basket means for entrance of air at one end and exit of flue gases from the other end,
said flues having porous walls through which air may diffuse from the flue into the carbonaceous fuel contained in the basket means, and through which gaseous products of combustion of said fuel may simultaneously diffuse from the burning fuel into the flues, said porous flue walls having pores small enough to contain the fuel and ash granules and prevent their movement into the flues, said flues having a predetermined hydraulic diameter such that during burning of the fuel a minimum of radiant energy is emitted from the ends of the flues yet sufficient air enters the flue to support high temperature combustion of the fuel.

37. A depot for granular carbonaceous fuel as defined in claim 36 wherein the hydraulic diameter of said flues is between substantially 0.3 and 0.5 inches.

38. A depot for granular carbonaceous fuel as defined in claim 36 wherein said basket means comprises an array of spaced-apart baskets between which baskets said array of open ended flues extend.

39. A depot for granular carbonaceous fuel as defined in claim 38 wherein said flues extend generally vertically for entrance of air at the lower end and exit of flue gases from the upper end.

40. A depot for granular carbonaceous fuel as defined in claim 38 wherein said array of baskets comprises a linear array.

41. A depot for granular carbonaceous fuel as defined in claim 38 wherein said array of baskets comprises a two-dimensional array.

42. A depot for granular carbonaceous fuel as defined in claim 36 wherein said granular fuel comprises a mixture of anthracite and charcoal, which mixture includes at least 50% by weight anthracite.

43. A depot for granular carbonaceous fuel as defined in claim 42 wherein said anthracite comprises Buckwheat #5.

44. A depot for granular carbonaceous fuel as defined in claim 36 wherein said basket means comprises a unitary basket having a member formed with an array of apertures, an array of open-ended porous refractory tubular members extending from said apertures formed in the basket to provide for said array of open ended flues.

* * * * *